United States Patent
Adatrao et al.

(10) Patent No.: US 7,634,258 B2
(45) Date of Patent: Dec. 15, 2009

(54) SYSTEM AND METHOD FOR OVER-THE-AIR UPDATE OF WIRELESS COMMUNICATION DEVICES

(75) Inventors: Ravi M. Adatrao, West Dundee, IL (US); David A. Klotzbach, Huntley, IL (US); Elliot M. Stewart, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 676 days.

(21) Appl. No.: 10/995,957

(22) Filed: Nov. 22, 2004

(65) Prior Publication Data

US 2006/0111084 A1 May 25, 2006

(51) Int. Cl.
*H04M 3/00* (2006.01)
(52) U.S. Cl. ............ 455/418; 455/419; 455/420; 455/422.1; 455/425
(58) Field of Classification Search ......... 455/418, 455/419, 420, 422.1, 425
See application file for complete search history.

(56) References Cited

U.S. PATENT DOCUMENTS

| | | | |
|---|---|---|---|
| 5,930,815 A * | 7/1999 | Estakhri et al. ............ 711/103 |
| 6,731,930 B2 | 5/2004 | Robin et al. | |
| 6,915,520 B2 * | 7/2005 | Sanchez, II ............ 719/315 |
| 2002/0112091 A1 * | 8/2002 | Schott et al. ............ 709/328 |
| 2004/0093592 A1 * | 5/2004 | Rao ............ 717/168 |
| 2004/0103412 A1 | 5/2004 | Rao et al. | |
| 2005/0155062 A1 * | 7/2005 | Hiltunen ............ 725/46 |
| 2006/0136165 A1 * | 6/2006 | Schuttert et al. ............ 702/120 |

* cited by examiner

*Primary Examiner*—Joseph H Feild
*Assistant Examiner*—Huy D Nguyen
(74) *Attorney, Agent, or Firm*—Ingrassia, Fisher & Lorenz, P.C.

(57) ABSTRACT

A system and method is provided for over-the-air updating of a wireless communication device. The system and method provides the ability to update both direct-addressable and non-direct-addressable portions of the device memory. The system and method uses an agent that is downloaded to the wireless communication device as part of a direct-addressable memory update package. The direct-addressable memory update installs the agent into the direct-addressable memory. After the direct-addressable memory update is performed, the agent is executed and performs an update of the non-direct addressable portions of the device memory.

27 Claims, 5 Drawing Sheets

SYSTEM AND METHOD FOR OVER-THE-AIR UPDATE OF WIRELESS COMMUNICATION DEVICES

FIELD OF THE INVENTION

This invention generally relates to communication systems, and more specifically relates to over-the-air updating of wireless communication devices.

BACKGROUND OF THE INVENTION

Wireless communication devices, such as wireless telephones, PDA's and other similar devices are increasingly important communication tools used by individuals, families and businesses. The features and functions of these wireless communication devices have increased rapidly in recent years, requiring ever increasing technical sophistication. At the same, interoperability requirements have increased the need for technical flexibility in these devices. For all these reasons, modem wireless communication devices typically require significant amounts of programming to provide the desired features and functions that consumers have grown to expect.

For example, in many wireless communication devices a first phase of programming is performed when the device is manufactured. This typically provides the base features and data that are common to devices of that type. A second round of programming may be then be used to provide a set of regional or customer specific requirements, features, security and distribution provision. For example, specialized programming may be used to adapt the wireless communication device for use in different carrier networks.

In some cases it is desirable to update the programming of existing wireless communication devices that are already in the hands of customers. For example, to add new features previously unavailable or to repair programming errors in the device. In each case, it is desirable to provide these updates in a convenient yet reliable manner. Most previous techniques have relied on direct physical connection to reprogram the device, e.g., plugging the device into a network that provides the reprogramming. This technique provides high levels of functionality, but can be unacceptably inconvenient for consumers that do not have ready access to the needed to hardware.

Other update methods have used over-the-air programming techniques. These techniques have provided the ability to update programming using wireless communication to the device. For example, a phone can be updating using the phone's inherent wireless communication ability. These techniques provide a convenient method for updating the device, because it can typically be accomplished while the device remains in the hands of the consumer. Unfortunately, previous techniques for over-the-air programming have had limited functionality. Specifically, they have been limited in the types of reprogramming that can be performed, and have thus been unable to update all aspects of wireless communication device programming.

As one specific example, some current techniques for over-the-air programming have been limited to updating direct addressable portions of device firmware. Specifically, some techniques for over-the-air updating have required all code that is being updated to reside in known address locations on the device. For example, some techniques use a differencing process that uses the known physical address locations and a comparison to the desired updated code to generate a code update, which can then be delivered to the communication device. This technique thus provides the ability to update areas of memory that have a known memory addressing structure, but they cannot be used to update other areas of the firmware where the memory address structure is not precisely known. Thus, they have been unable to provide over-the-air updates to all portions of the communication device firmware such as those portions that are not directly addressable.

Thus, what is needed is an improved system and method for over-the-air updating of wireless communication devices that provides the ability to update non-direct addressable portions of firmware in the device.

BRIEF SUMMARY OF THE INVENTION

The present invention provides a system and method for over-the-air updating of a wireless communication device. The system and method provides the ability to update both direct-addressable and non-direct-addressable portions of the device memory. The system and method uses an agent that is downloaded to the wireless communication device as part of a direct-addressable memory update package. The direct-addressable memory update installs the agent into the direct-addressable memory. After the direct-addressable memory update is applied, the agent is executed and performs an update of the non-direct addressable portions of the device memory.

The system and method is thus able to update both direct-addressable and non-direct-addressable portions of device memory. This provides increased ability to update device features and functionality. As one example, the system and method can be adapted to control the activation of future over-the-air updates. Thus, the system and method can be used to disable over-the-air update package functionality.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a system and method for over-the-air updating of a wireless communication device. The system and method provides the ability to update both direct-addressable and non-direct-addressable portions of the device memory.

Figure 1:
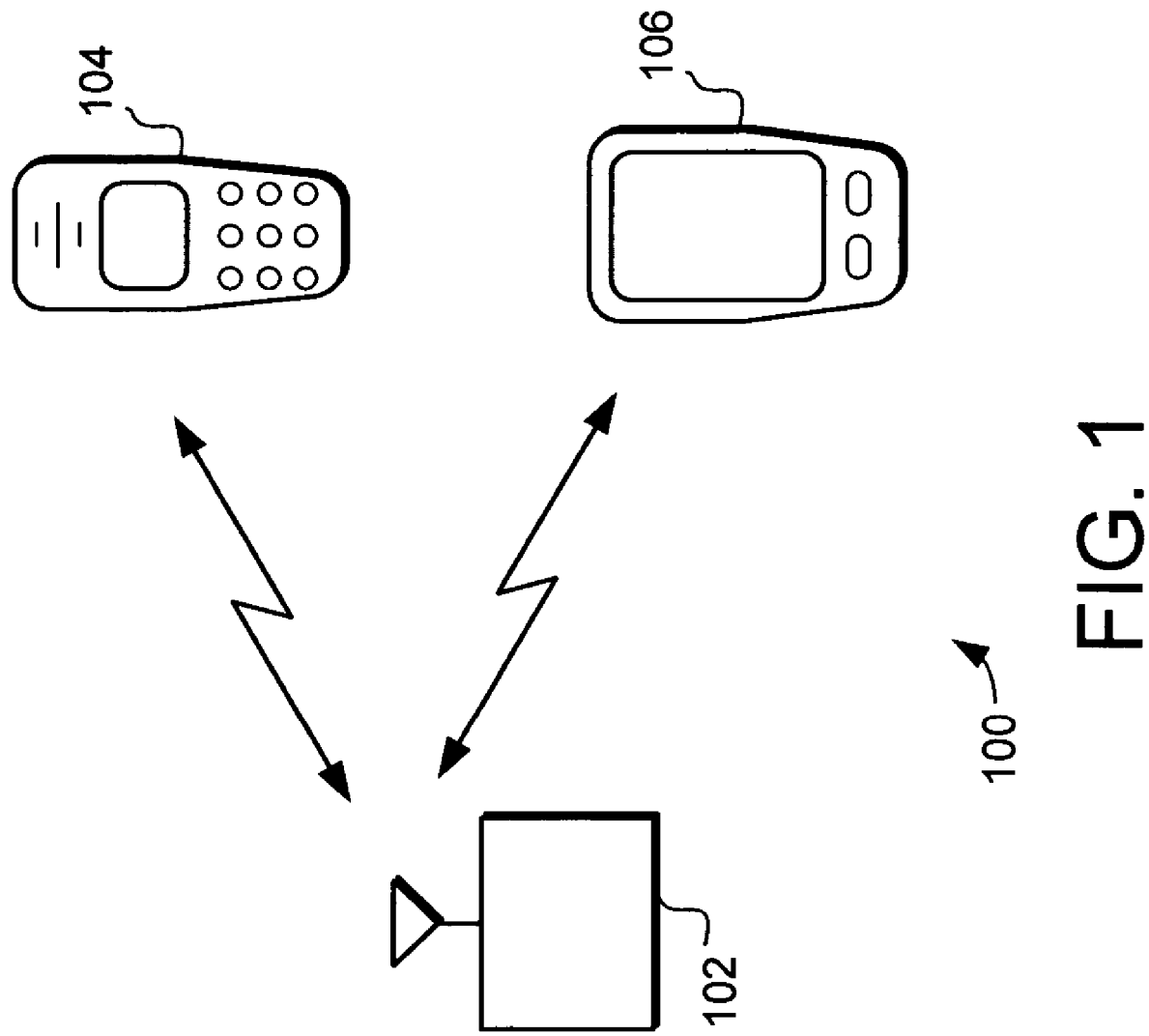
FIG. 1 is a schematic view of an communication system in accordance with an embodiment of the invention.

Turning now to FIG. 1, an exemplary wireless communication system 100 is illustrated. The system 100 comprises a communication network transmitter 102, a first wireless communication device 104 and a second wireless communication device 106. In the illustrated example, the first wireless communication device 104 comprises a wireless telephone, and second wireless communication device comprises a text messaging device. The wireless communication devices 104 and 106 communicate with the network 102 using wireless, over-the-air communication. Of course, in most cases a typical wireless communication system 100 would include a greater number and variety of transmitters and communication devices. For example, the wireless communication devices can also include personal digital assistants (PDAs), pagers, and portable media devices.

A typical wireless communication device includes a significant amount of programming. This programming implements the various features and functions of the device. The programming is stored in memory on the device. Typically, the device uses permanent or semi-permanent memory (e.g., firmware) as the preferred type of memory because of its ability to retain data without power. Examples of permanent or semi-permanent memory would include but not be limited to, EEPROM, flash, nonvolatile random access memories (NVRAM) and battery backed up static random access memory (SRAM). However, some devices can use other types of memory to store programming.

Included in the memory of many wireless communication devices are direct-addressable memory portions and non-direct addressable memory portions. In this application, the direct-addressable memory portions are those portions of the memory that are accessed by the systems in the device directly using their addresses. This would commonly include areas of memory that store processor instructions (programs) and fixed data assets such as location addressed data tables. Likewise, non-direct-addressable memory portions are defined as those areas that are not directly addressable by a known address but are instead addressed by their content or the context of their content using instructions and appropriate techniques. Examples of non-direct-addressable memory portions would include data such as databases, indirect tables and subscriber entitlements. Typically a wireless communication device will these store different types of data in different locations on the memory.

Figure 2:
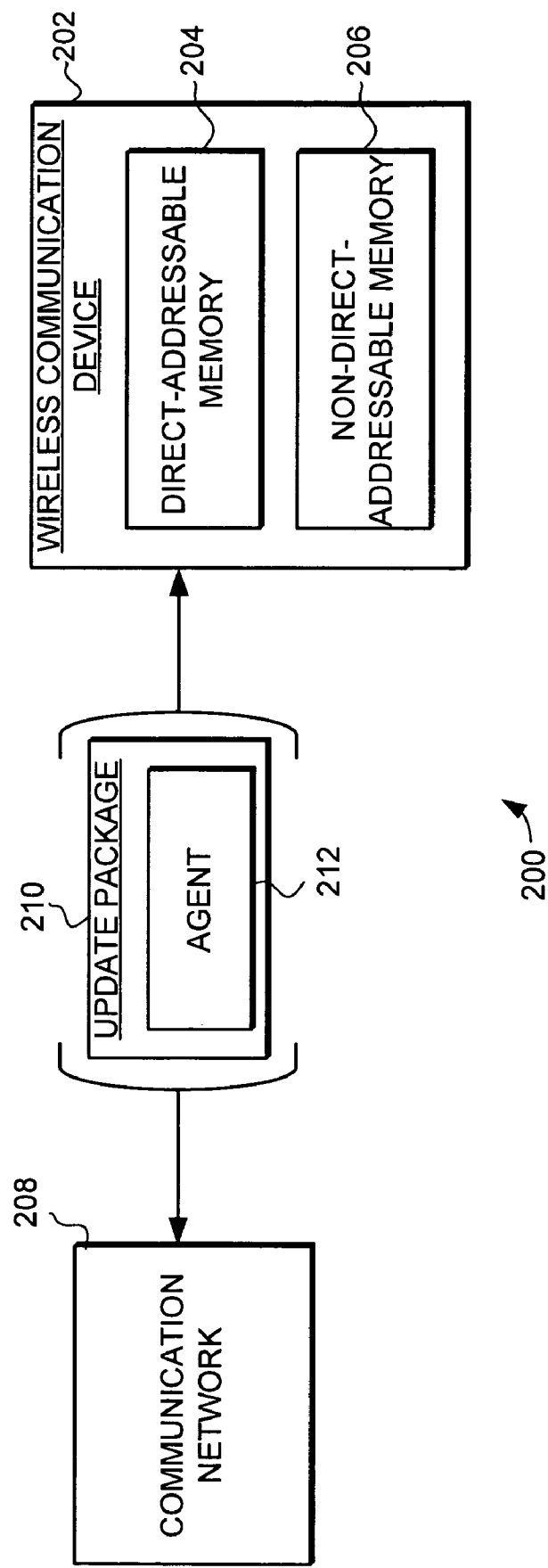
FIG. 2 is a schematic view of update system in accordance with an embodiment of the invention.

Turning now to FIG. 2, a schematic view of an update system 200 is illustrated. The update system 200 provides the ability to update the code and other data in the wireless communication device 202. Specifically, the system 200 provides the ability to update both direct-addressable memory 204 and non-direct-addressable memory 206 on the device 202.

The system 200 delivers a update package 210 from the communication network 208 to the wireless communication device 202. The update package 210 is delivered over-the-air, and is designed to update the direct-addressable memory 204. When installed on the wireless communication device 202 the update package 210 is applied. The update package 210 then changes the code and other data stored in the direct-addressable memory 204. This can include a variety of different types of updates to the direct-addressable memory 204, including updates to the functionality of the wireless communication device 202.

Among the memory changes provided by the application of the update package 210 is the installation of the agent 212 in the direct-addressable memory 204 of the wireless communication device 202. The agent 212 provides the mechanism that will be used to update the non-direct-addressable memory 206. Thus, when executed the agent 212 will perform an update on the non-direct-addressable memory 206. Agent 212 can perform a variety of different types of updates on the data in the non-direct-addressable memory 206, including installing new data and program functionality. The agent 212 is preferably fault-tolerant such that it will restart if the agent 212 is terminated prematurely without completing its non-direct-addressable memory 206 update.

The system 200 is thus able to update both direct-addressable memory 204 and non-direct-addressable memory 206. This provides increased ability to update device features and functionality on the wireless communication device 202. As one example, the system 200 can be adapted to control the activation of future over-the-air updates for the wireless communication device 202. Thus, the system 200 can be used to disable over-the-air update package functionality.

Figure 3:
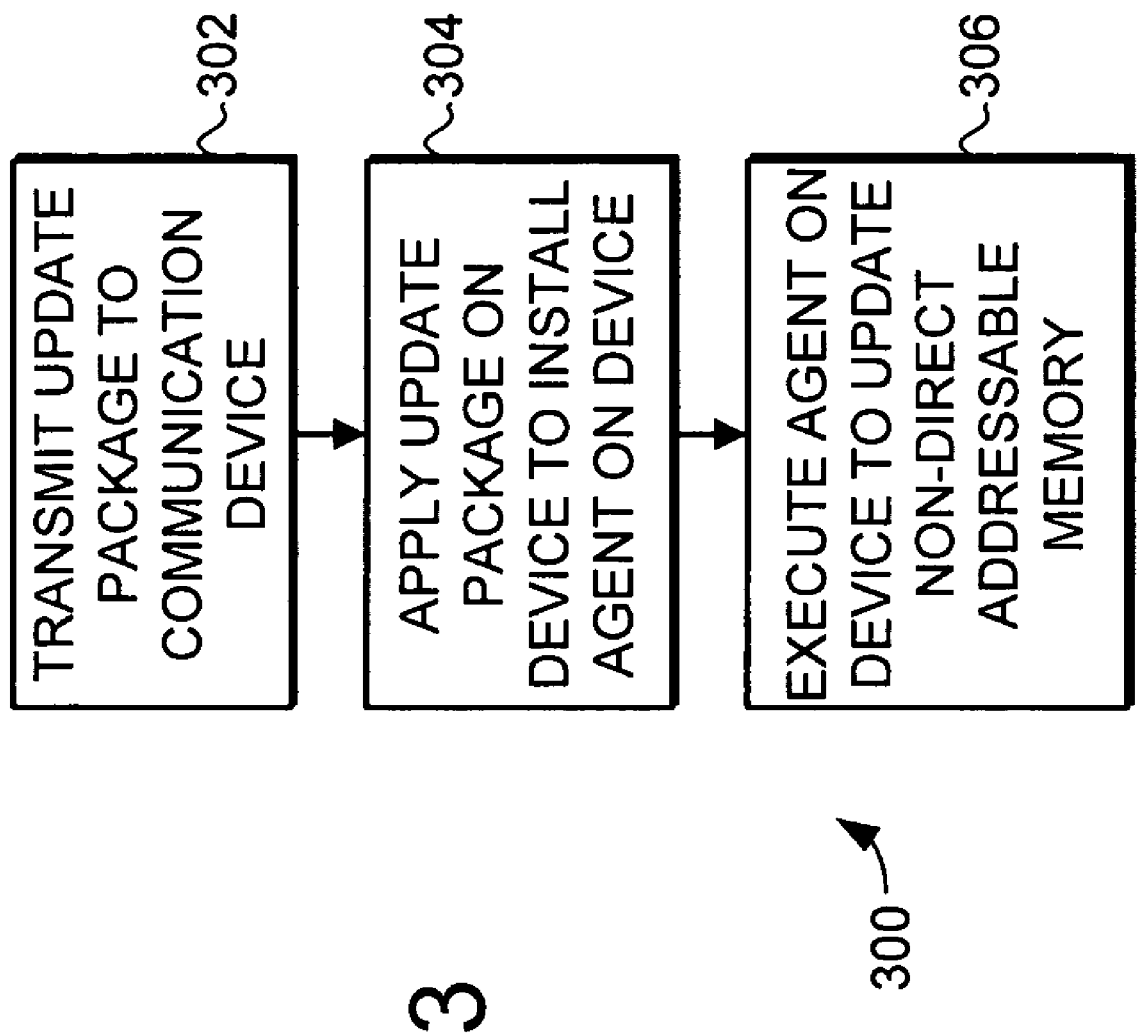
FIG. 3 is a flow diagram illustrating an update method in accordance with an embodiment of the invention.

Turning now to FIG. 3, a method 300 for updating a wireless communication device is illustrated. The method 300 provides the ability to update code and other data in a wireless communication device over the air. Specifically, the method 300 provides the ability for over-the-air update of both direct-addressable memory and non-direct-addressable memory in a communication device.

The first step 302 is to transmit an update package to the communication device. The update package is designed to modify data in direct-addressable memory portions of the communication device. As such, the update package can use a variety of over-the-air update techniques. One exemplary technique is to generate a difference file for the direct-addressable memory portions representing the difference between the current data structure in the memory and the desired data structure in the memory. This difference file is implemented into an update package, which is transmitted to the wireless communication device. Part of the desired difference based update provides the addition of an update agent to the wireless communication device. Thus, transmitting the update program to the wireless communication device results in the transmission of the update agent to the device.

The next step 304 is to apply the update package the on the wireless communication device. Applying the program modifies the data in the direct-addressable portions of the device memory. Included in this process is the installation of the agent in the direct addressable portions of the memory. Of course, the update package can also modify other portions of the direct-addressable memory, including changing other functions and parameters on the device. A more detailed example of how the update package can modify direct-addressable portions of the memory will be discussed below.

The next step 306 is to execute the agent on the device to update the non-direct-addressable memory. When executed, the agent can perform a variety of different types of updates on the data in the non-direct-addressable memory, including installing new data and program functionality. A more detailed example of how the agent can modify non-direct-addressable portions of the memory will be discussed below.

The method 300 is thus able to update both direct-addressable memory and non-direct-addressable memory. This provides increased ability to update device features and functionality on the wireless communication device. As one example, the method 300 can be adapted to control the activation of future over-the-air updates for the wireless communication device. Thus, the method 300 can be used to disable over-the-air update package functionality.

As stated above, the agent used to update non-direct-addressable memory can be delivered using a technique for updating the direct-addressable memory. Several techniques exist for creating and delivering updates for direct-addressable memory over-the-air. For example, one technique for creating and delivering updates to direct-addressable memory uses differencing. To perform an update using differencing a new code set for the wireless device is first developed. This code set comprises what will be the final code on the direct-addressable memory when its update is complete. In the embodiments of the present invention, this new code set includes the agent that will be used to update the non-direct addressable memory portions of the device. Typically, the new code set would also include other updates to the direct-addressable memory, such as adding or deleting features, fixing errors, or changing operational parameters of the device. All of these changes can be accomplished by updating the relevant part of the code in the direct-addressable memory.

A diff generator is then used to compare the new code set with the current code set on the wireless device. When doing this comparison, the diff generator uses the physical addresses of the current code set and the desired new code set. Thus, the diff generator is able to compare and determine the precise difference between the current code set and the new code. From this comparison, the diff generator produces a set of instructions that describe the difference between the current code set and the new code set. It is these instructions that are packaged and passed to the wireless communication device as the update package to facilitate update of the direct-addressable memory. Packaging the new code set as a set of instructions based on the code difference allows the code to be updated using an update package with much smaller file size than would be required to update with a simply copy of the new code. As one exemplary embodiment, the update package can be created using a product such as mProve, available from the Bitfone Corporation.

Figure 4:
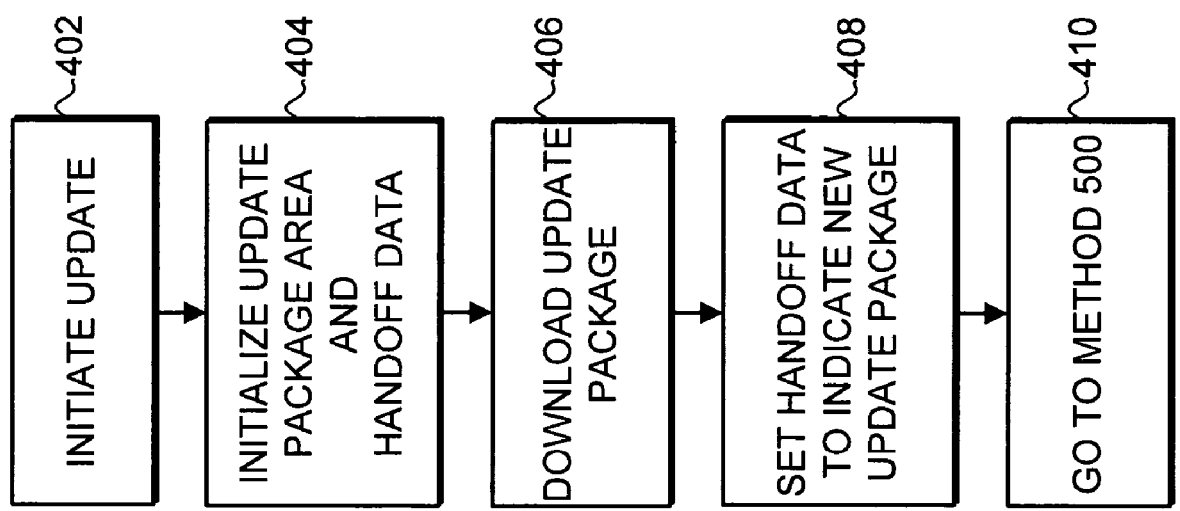
FIGS. 4 and 5 are flow diagrams a specific embodiment of an update method.
Figure 5:
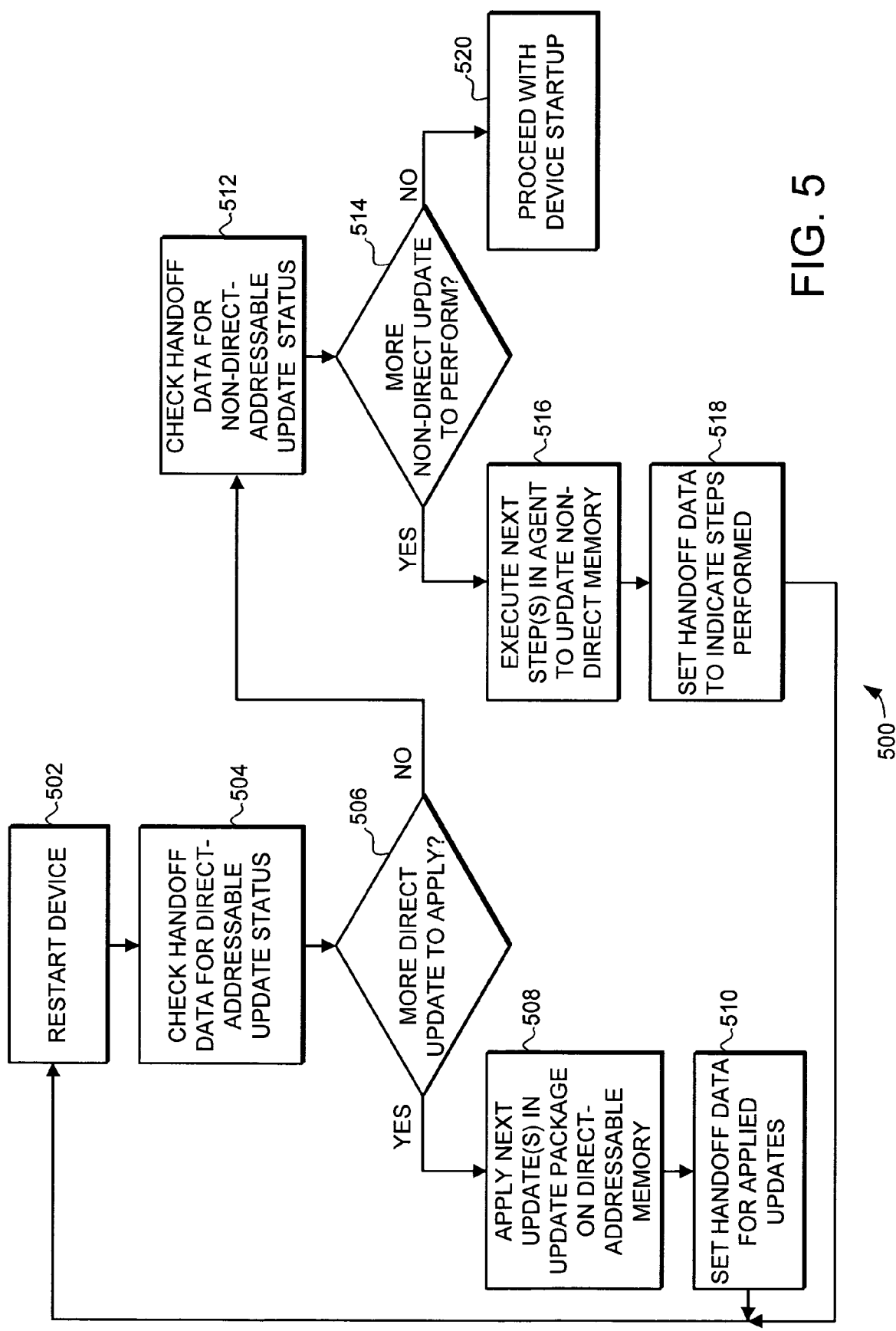

Turning now to FIGS. 4 and 5, a specific embodiment of a wireless communication update procedure is illustrated. The procedures illustrated in FIGS. 4 and 5 use an update package and provide the ability for over-the-air update of both direct-addressable memory and non-direct-addressable memory in a communication device.

Beginning with method 400 in FIG. 4, the first step 402 is to initiate the update. In some cases the update will be used to add or remove features on communication device, and in other cases it can used to change operational parameters of the device. Typically, the user of the device will be notified that an update is available or desirable, or the user will simply request that new feature be added. In some cases the wireless communication device sends device profile and subscriber information to the communication network. For that information, the system can determine what if any update is appropriate for that particular device. When an appropriate update is available, the communication network notifies the user of the available update. The user can then initiate the process of downloading and installing the update.

When initiated, the next step 404 is to initialize an update package area and handoff data. The update package area is the portion of device memory where the update package will be downloaded and stored. The handoff data provides a set of data that are used to track the progress of the updates. Preferably, the handoff data includes a first section of data to track the updating of the direct-addressable memory and a second section of data to track the updating of the non-direct addressable memory. The handoff data will be used to ensure that a downloaded update is applied, yet applied only once. Furthermore, the handoff data can be used to track the update changes such that if an update is interrupted prior to completion, the status of the update is saved and can be restarted at the appropriate place.

The next step 406 is to download the update package. This can be done by first sending a URL of a descriptor file from the network system to the device. The descriptor file describes the contents of the update package. For example, the descriptor file can describe the size, type, location and other details about the update package. With the URL received, a download agent on the communication device downloads the descriptor file and parses it for the URL, size and other details of the update package. The size is then checked to insure that the update package doesn't exceed the available memory in the update package area. If sufficient memory is available, the download agent then initiates download of the update package, which is then stored on the communication device.

The next step 408 is to set handoff data to indicate a new update package. As described above, the handoff data includes a section designed to track the updating of both direct and non-direct memory. Step 408 sets that section to indicate the presence of a newly downloaded update package that has yet to be processed for updating. Step 408 would typically be performed by an update agent. The update agent is a program on the wireless communication device designed to process the update package and update the direct-addressable memory of the wireless device.

With the download complete and the handoff data set, the next step 410 is to go to method 500, illustrated in FIG. 5. In general method 500 applies the update package and the updates both the direct and non-direct addressable portions of memory. Again, the update package was produced from a comparison of the current code set and the new desired code set. The update package includes instructions that the update agent uses convert the current code set on the device to the new, desired code set that includes the agent for updating the non-direct addressable memory. Thus, when the update package is applied by the update agent, the direct-addressable portions of memory on the wireless device are updated to the desired new code set. This installs the agent for updating the non-direct addressable memory on the device.

The first step 502 of method 500 is to restart the device. Wireless communication device are typically configured to perform a variety of operations on startup. For example, security, sanity and code quality checks are commonly preformed, with the device then starting normal operation and presenting the user with a home screen. A bootstrap procedure is commonly used to control this startup procedure.

The next step 504 is to check the handoff data for direct-addressable update status. As described above, the handoff data are used to track the status of the updates. When a new update package has been downloaded and the data reset as described with reference to method 400 the handoff data will indicate that an update package is pending (e.g., has been downloaded, but not yet applied)

The step of checking the handoff data is preferably preformed by the bootstrap process that controls the initial startup of the device. Thus, the bootstrap procedure that controls the initial startup can be configured to check the handoff data to determine if a direct-address update is pending.

It should be noted that step 504 preferably checks to determine both if a new update to the direct-addressable memory is pending or if an update was previously partially applied but uncompleted. Both of these states can be indicated by a corresponding pattern in the handoff data. If a new update is pending an additional step validating the update can be performed before proceeding to step 506. Conversely, if an update has been started but not completed the method can proceed directly to step 506.

Decision step 506 determines if more direct-address memory updates are ready to be applied based on the check of the of the handoff data for the direct-addressable memory. If there is more update to apply, the next step 508 is to apply the next updates in the update package on the direct-addressable memory. This is typically performed by the update agent on the device. Again, the update package was produced from a comparison of the current code set and the new desired code set. Thus, the update package includes instructions that the update agent uses to convert the current code set on the device to the new, desired code set that includes the agent for updating the non-direct addressable memory. Thus, when the update package is applied by the update agent, the direct-addressable portions of memory on the wireless device are updated to the desired new code set. This installs the agent for updating the non-direct addressable memory on the device.

As one example, the agent is installed by integrating the agent with a power-up power-down (PUPD) procedure that is used in the startup process. For example, the agent is implemented in code compatible with the PUPD and installed as part of the new version of the PUPD. This can be accomplished by editing a template for the agent or using a build script to create the code. Thus, the PUPD procedure is modified to include the agent, and thus includes the information needed to update the non-direct addressable memory. In cases where no changes to the non-direct addressable memory are needed, the agent code can be removed or otherwise compiled out.

With the next updates applied, the next step 510 is to set the handoff data for the performed updates. Thus, if the direct-addressable update is completed, the data would be set to indicate that state. Conversely, if the update is only partially completed, the data would be set to indicate that state.

With the handoff data set, the method returns to step 502 to again restart the device. Restarting the device re-initializes the device and restarts the process. Thus, the bootstrap procedure will again check the handoff data for the direct addressable update status. If the status check indicates that the update is still not yet complete then steps 508 and 510 will be performed again. This process is continued until the update of the direct-addressable memory is completed. This process facilitates updates that require multiple cycles to complete. Furthermore, it provides the ability to restart updates at the appropriate point when updates are stopped prematurely. For example, when a battery is removed during the update. Thus, the update of the direct-addressable memory is performed in a fault tolerant manner. Eventually the direct-addressable memory update will be completed and decision step 506 will determine that no more direct-addressable memory updates are left to be applied. This completes the update to the direct-addressable memory, including the installation of the update for the non-direct addressable memory.

At this point the method 500 moves to step 512, where the handoff data is checked for update status of the non-direct addressable memory. Again, the handoff data are used to track the status of the updates. When a new agent has just been installed in the direct-addressable memory the handoff data will indicate that an agent to update the non-direct addressable memory has been installed but not yet applied.

The step of checking the handoff data for non-direct addressable memory update is also preferably preformed by the bootstrap process that controls the initial startup of the device. Again, step 512 preferably checks to determine both if a new agent for updating non-direct-addressable memory is pending or if an agent was previously partially performed but uncompleted. Both of these states can be indicated by a corresponding pattern in the handoff data. If a new update is pending an additional step of validating the agent can be performed before proceeding to step 514. If an agent is partially completed the method can proceed directly to step 514.

Decision step 514 determines if more steps in the non-direct-address memory update are waiting to be performed based on the check of the of the handoff data for the non-direct-addressable memory. If there is more update to perform, the next step 516 is to perform the next steps in the agent for updating the non-direct-addressable memory.

Because the memory being updated in this step is not directly addressable, a different technique is used to update the non-direct addressable portions. Specifically, since by its nature the data is either content or context addressable, the data itself when submitted to the data element management functions will determine the appropriate data update processing. For example, the same instructions and API calls that are used in their runtime access and maintenance can be used to update the non-directly addressable data. Thus, the data itself includes enough information to make the changes and additional support is typically not required.

With the next steps in the agent performed, the next step 518 is to set the handoff data for the performed updates. Thus, if the non-direct-addressable update is completed, the data would be set to indicate that state. Conversely, if the agent is only partially completed, the data would be set to indicate that state. Thus, the data would indicate which elements of the agent have been implemented and which have not.

With the handoff data for the non-direct addressable memory update set, the method returns to step 502 to again reset the device. Resetting the device re-initializes the device and restarts the process. Thus, steps 504 and 506 will again be used to check the handoff for the direct addressable update status to determine if a direct-addressable memory update is pending. Steps 512 and 514 will then determine if a non-direct addressable memory update is pending. If the status check indicates that the update to the non-direct addressable memory is not yet complete, then steps 516 and 518 will be performed again until the update to the non-direct addressable memory portion is completed. This again facilitates updates that require multiple cycles to complete. Furthermore, it again provides the ability to restart updates at the appropriate point when updates are stopped prematurely. Thus, the update of the non-direct-addressable memory is performed in a fault tolerant manner. Eventually both the direct-addressable memory update and the non-direct addressable memory update will be completed and decision steps 506 and 514 will determine that no more updates are left to be performed. This completes the update of both the direct-addressable memory and non-direct addressable memory, and the next step 520 is to proceed with device startup. This transfer control of the startup to the usual device software that controls the operation of the device. In some cases it will also be desirable for the wireless device to confirm the updated status with the network. This insures that the network is again aware of the status of the code on the direct-addressable memory.

The system and method can thus be used to update the non-direct addressable memory portions to provide a wide range of changes to the device. As one specific example, the system and method can be adapted to control the activation of future over-the-air updates. In this case, the agent that is downloaded to update the non-direct addressable portions of memory disables the ability to perform future over-the-air updates. Because this ability was controlled in the non-direct addressable memory, previous techniques that only updated direct-addressable memory could not be used to disable this feature.

Those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks, and transmission media such as digital and analog communication links, including wireless communication links.

Thus, the present invention thus provides a system and method for over-the-air updating of a wireless communication device. The system and method provides the ability to update both direct-addressable and non-direct-addressable portions of the device memory. The system and method uses an agent that is downloaded to the wireless communication device as part of a direct-addressable memory update package. The direct-addressable memory update installs the agent into the direct-addressable memory. After the direct-addressable memory update is performed, the agent is executed and performs an update of the non-direct addressable portions of the device memory.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A method of updating wireless communication device, wherein the wireless communication device includes a memory, and wherein the memory includes a direct-addressable portion and a non-direct-addressable portion, the method comprising the steps of:
    transmitting an update package to the wireless communication device over-the-air;
    applying the update package on the wireless communication device, the update package performing an update on the direct-addressable portion of memory in the wireless communication device, the update package installing an agent in the direct-addressable portion of the memory; and
    executing the agent on the wireless communication device, the agent updating the non-direct-addressable portion of the memory;
    wherein the agent updates the non-direct-addressable portion of the memory to disable over-the-air update package functionality of the wireless communication device.

2. The method of claim 1 further comprising the step of removing the agent from the wireless communication device after the step of executing the agent.

3. The method of claim 1 wherein the update package comprises an update based on a difference between a current state of the direct-addressable portion of memory and a desired state of the direct-addressable portion.

4. The method of claim 1 wherein the step of executing the agent on the wireless communication device performs a record-by-record update of the non-record-addressable portion of the memory.

5. The method of claim 1 wherein the step of executing the agent on the wireless communication device comprises performing a record-by-record update of the non-direct-addressable portion of the memory using API calls on the wireless communication device.

6. The method of claim 1 wherein the wireless communication device comprises a wireless telephone.

7. The method of claim 1
    wherein the update package installs the agent as part of a power-up power-down procedure in the direct-addressable portion of the memory.

8. The method of claim 7 further comprising the step of removing the agent from the wireless communication device after the step of executing the agent.

9. The method of claim 7 wherein the update package comprises an update based on a difference between a current state of the direct-addressable portion of memory and a desired state of the direct-addressable portion.

10. The method of claim 7 wherein the step of executing the agent on the wireless communication device performs a record-by-record update of the non-record-addressable portion of the memory.

11. The method of claim 7 wherein the step of executing the agent on the wireless communication device comprises performing a record-by-record update of the non-direct-addressable portion of the memory using API calls on the wireless communication device.

12. The method of claim 7 wherein the step of executing the agent comprises restarting execution if execution of the agent is terminated prior to completion.

13. The method of claim 1 wherein the step of executing the agent comprises restarting execution if execution of the agent is terminated prior to completion.

14. The method of claim 1 wherein the memory comprises firmware.

15. A method of updating wireless communication device, wherein the wireless communication device includes a memory, and wherein the memory includes a direct-addressable portion and a non-direct-addressable portion, the method comprising the steps of:
    transmitting an update package to the wireless communication device over-the-air;
    applying the update package on the wireless communication device, the update package performing an update on the direct-addressable portion of memory in the wireless communication device, the update package installing an agent in the direct-addressable portion of the memory;
    executing the agent on the wireless communication device, the agent updating the non-direct-addressable portion of the memory;
    transmitting a second update package to the wireless communication device over-the-air;
    applying the second update package on the wireless communication device, the second update package performing a second update on the direct-addressable portion of memory in the wireless communication device, the update package installing a second agent in the direct addressable portion of the memory; and
    executing the second agent on the wireless communication device, the second agent updating the non-direct-addressable portion of the memory;
    wherein the second agent updates a different portion of the non-direct-addressable portion of the memory than the first agent.

16. A system for updating wireless communication device, wherein the wireless communication device includes a memory, and wherein the memory includes a direct-addressable portion and a non-direct-addressable portion, the system comprising:
    an update package, the update package transmitted to the wireless communication device over-the-air; and
    an update agent on the wireless communication device, the update agent applying the update package on the wireless communication device to perform an update on the direct-addressable portion of memory in the wireless communication device, including the installation of an agent in the direct-addressable portion of the memory, the update agent then executing the agent on the wireless communication device to update the non-direct-addressable portion of the memory;
    wherein the agent updates the non-direct-addressable portion of the memory to disable over-the-air update package functionality of the wireless communication device.

17. The system of claim 16 wherein the agent is removed from the wireless communication device after agent is executed.

18. The system of claim 16 wherein the update package comprises an update based on a difference between a current state of the direct-addressable portion of memory and a desired state of the direct-addressable portion.

19. The system of claim 16 wherein the agent on the wireless communication device performs a record-by-record update of the non-direct-addressable portion of the memory.

20. The system of claim 16 wherein the agent on the wireless communication device performs a record-by-record update of the non-direct-addressable portion of the memory using API calls on the wireless communication device.

21. The system of claim 16 wherein the wireless communication device comprises a wireless telephone.

22. The system of claim 16
wherein the update package installs the agent as part of a power-up power-down procedure in the direct- addressable portion of the memory.

23. The system of claim 16 wherein the memory comprises firmware.

24. A method of updating wireless communication device, wherein the wireless communication device includes a memory, and wherein the memory includes a direct-addressable portion and a non-direct-addressable portion, the method comprising the steps of:
transmitting an update package to the wireless communication device over-the-air, the update package comprising update an update based on a difference between a current state of the direct-addressable portion of memory and a desired state of the direct-addressable portion that includes an agent for updating a non-direct-addressable portion of memory;
applying the update package on the wireless communication device, the update package performing an update on the direct-addressable portion of memory in the wireless communication device, the update package installing the agent in the direct addressable portion of the memory;
executing the agent on the wireless communication device, the agent updating the non-direct-addressable portion of the memory by performing a record-by-record update of the non-direct-addressable portions of the memory using procedure calls on the wireless communication device; and
restarting execution if execution of the agent is terminated prior to completion;
wherein the agent updates the non-direct-addressable portion of the memory to disable over-the-air update package functionality of the wireless communication device.

25. The method of claim 24 wherein the wireless communication device comprises a wireless telephone.

26. A system for updating wireless communication device, wherein the wireless communication device includes a memory, and wherein the memory includes a direct-addressable portion and a non-direct-addressable portion, the system comprising:
update package, the update package transmitted to the wireless communication device over-the-air, the update package comprising update an update based on a difference between a current state of the direct-addressable portion of memory and a desired state of the direct-addressable portion that includes an agent for updating a non-direct-addressable portion of memory; and
an update agent on the wireless communication device, the update agent applying the update package on the wireless communication device to perform an update on the direct-addressable portion of memory in the wireless communication device, the update installing the agent in the direct addressable portion of the memory, and wherein the update agent executes the agent on the wireless communication device to update the non-direct-addressable portion of the memory by performing a record-by- record update of the non-direct-addressable portions of the memory using procedure calls on the wireless communication device, and wherein the update agent restarts execution if execution of the agent is terminated prior to completion;
wherein the agent updates the non-direct-addressable portion of the memory to disable over-the-air update package functionality of the wireless communication device.

27. The system of claim 26 wherein the wireless communication device comprises a wireless telephone.

* * * * *